United States Patent
Senda et al.

(10) Patent No.: US 9,140,219 B2
(45) Date of Patent: Sep. 22, 2015

(54) VAPOR FUEL PROCESSING APPARATUS

(71) Applicant: DENSO CORPORATION, Kariya, Aichi-pref. (JP)

(72) Inventors: Takashi Senda, Niwa-gun (JP); Hidetoshi Ooiwa, Anjo (JP)

(73) Assignee: DENSO CORPORATION, Kariya (JP)

(*) Notice: Subject to any disclaimer, the term of this patent is extended or adjusted under 35 U.S.C. 154(b) by 282 days.

(21) Appl. No.: 13/960,843

(22) Filed: Aug. 7, 2013

(65) Prior Publication Data

US 2014/0102419 A1    Apr. 17, 2014

(30) Foreign Application Priority Data

Oct. 15, 2012   (JP) ................. 2012-227820

(51) Int. Cl.
*F02M 25/08*    (2006.01)
*B60K 15/035*   (2006.01)

(52) U.S. Cl.
CPC ............. *F02M 25/08* (2013.01); *F02M 25/089* (2013.01); *B60K 15/03504* (2013.01); *B60K 15/03519* (2013.01); *F02M 25/0836* (2013.01); *F02M 2025/0845* (2013.01)

(58) Field of Classification Search
CPC ............ B60K 15/03504; B60K 15/03519; F02M 25/0836; F02M 25/0845
USPC ............. 123/519, 516, 518, 520, 198 D; 137/587–589
See application file for complete search history.

(56) References Cited

U.S. PATENT DOCUMENTS 4,815,436 A * 3/1989 Sasaki et al. ............. 123/520
2013/0221000 A1* 8/2013 Iwaya et al. ............. 220/86.2

FOREIGN PATENT DOCUMENTS

| JP | H02-130254 A | 5/1990 |
| JP | 05-332204 H | 12/1993 |
| JP | H06-159155 A | 6/1994 |
| JP | H10-196467 A | 7/1998 |
| JP | 3074808 B | 6/2000 |
| JP | 2003-021003 A | 1/2003 |
| JP | 2003-035214 A | 2/2003 |
| JP | 2004-156496 A | 6/2004 |

OTHER PUBLICATIONS

Office Action issued Sep. 30, 2014 in corresponding JP Application No. 2012-227820 (with English translation).
U.S. Appl. No. 13/860,162, Senda et al.

* cited by examiner

*Primary Examiner* — Mahmoud Gimie

(57) ABSTRACT

A canister absorbs evaporated fuel produced in a fuel tank and supplies the absorbed evaporated fuel to an engine. A sealing valve is equipped between the fuel tank and the canister. A detection unit detects a state of a lid of the fuel tank. An intention estimation unit estimates existence of a refueling intention according to an activity of a user. A release time period estimation unit estimates a release time period, which is needed to release a pressure in the fuel tank, according to a state of a vehicle. A manipulation control unit opens the sealing valve when the lid is opened. The manipulation control unit opens the sealing valve, even in a case where the lid is closed, on estimation that the refueling intention exists, and on determination that the estimated release time period is greater than a predetermined time period.

6 Claims, 2 Drawing Sheets

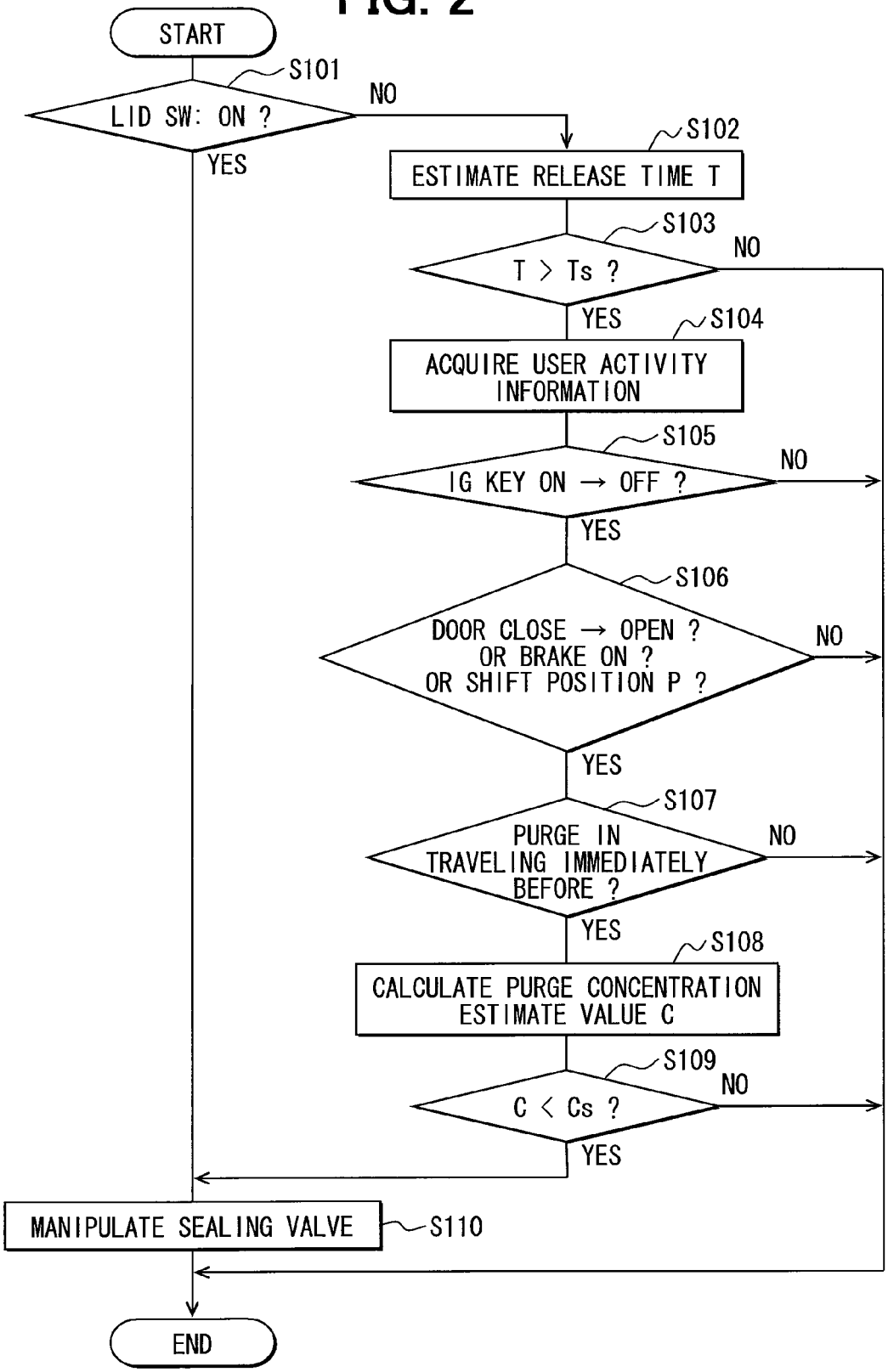

VAPOR FUEL PROCESSING APPARATUS

CROSS REFERENCE TO RELATED APPLICATION

This application is based on reference Japanese Patent Application No. 2012-227820 filed on Oct. 15, 2012, the disclosure of which is incorporated herein by reference.

TECHNICAL FIELD

The present disclosure relates to a vapor fuel processing apparatus.

BACKGROUND

In recent years, demands are increasing on reduction in fuel consumption for a vehicle. A specific vehicle, such as a hybrid vehicle (HEV) and a vehicle employing an idling stop system, operates an engine less frequently, compared with a conventional vehicle. In addition, a specific vehicle currently employs a variable lift mechanism and an Atkinson cycle engine to reduce fuel consumption. Thus, as an engine is less frequently operated in a vehicle, or as a variable lift mechanism or an Atkinson cycle engine is increasingly employed in a vehicle, negative pressure in an intake manifold in such a vehicle is being remarkably reduced. A vehicle may be equipped with a vapor fuel processing apparatus configured to implement canister purge to supply evaporated fuel, which is produced in a fuel tank, through a canister into an internal combustion engine. As negative pressure in an intake manifold decreases, frequency of the canister purge and differential pressure for implementing the canister purge decreases. Therefore, it is increasingly becoming difficult to secure a quantity of gas needed in the canister purge. For example, a patent document 1 discloses a sealing valve for restricting outflow of evaporated fuel from a fuel tank.

[Patent Document 1] Publication of unexamined Japanese patent application No. 2004-156496

In such a configuration, as disclosed in the patent document 1, equipment of the sealing valve for restricting outflow of evaporated fuel from the fuel tank may cause increase in inner pressure of the fuel tank. In a condition, in which inner pressure of the fuel tank is high, a fill opening of the fuel tank may be opened. In such a case, evaporated fuel produced in the fuel tank may be emitted through the fill opening to the atmosphere. The patent document 1 further discloses a sensor, a switch, and/or the like equipped in a refueling lid or the fill opening to detect an operation for refueling. Further, when the operation for refueling is detected, the sealing valve is released. It is noted that, when the internal pressure of the fuel tank is high, it takes time to reduce the inner pressure of the fuel tank to a predetermined pressure, such as the atmospheric pressure, after the sealing valve is opened. The patent document 1 further discloses a configuration to prohibit an activity to open the fill opening, that is, not to permit refueling, in order to restrict emission of evaporated fuel through the fill opening, until release of the inner pressure of the fuel tank is completed.

It is further noted that, in the patent documents 1, a user may be kept waiting until the release of the inner pressure of the fuel tank is completed. Therefore, the system of the patent documents 1 may be inconvenient for a user hurrying in refueling.

SUMMARY

It is an object of the present disclosure to produce a vapor fuel processing apparatus configured to restrict emission of evaporated fuel to the atmosphere and to enhance convenience of a user at the time of refueling a vehicle.

The present disclosure relates to a vapor fuel processing apparatus configured to cause a canister to absorb evaporated fuel, which is produced in a fuel tank, and to supply the evaporated fuel, which is absorbed in the canister, to an internal combustion engine. The vapor fuel processing apparatus includes a sealing valve and a control section. The sealing valve is equipped to a vapor passage, which communicates the fuel tank with the canister.

According to an aspect of the present disclosure, a vapor fuel processing apparatus is configured to cause a canister to absorb evaporated fuel produced in a fuel tank and to supply evaporated fuel absorbed in the canister to an internal combustion engine. The vapor fuel processing apparatus comprises a sealing valve equipped to a vapor passage, which communicates the fuel tank with the canister. The vapor fuel processing apparatus further comprises a control section. The control section includes a manipulation control unit configured to control manipulation of the sealing valve. The control section further includes a lid opening-and-closing detection unit configured to detect an opening/closing state of a lid of a fill opening of the fuel tank. The control section further includes a refueling intention estimation unit configured to estimate existence of a refueling intention with reference to user activity information related to an activity of a user. The control section further includes a release time period estimation unit configured to estimate a release time period, which is needed to release a pressure in the fuel tank, with reference to vehicle information relating to a state of a vehicle. The manipulation control unit is further configured to open the sealing valve when the lid is opened. The manipulation control unit is further configured to open the sealing valve, even in a case where the lid is closed, when the refueling intention estimation unit estimates that the refueling intention exists, and when the release time period, which is estimated by the release time period estimation unit, is determined to be greater than a predetermined time period.

BRIEF DESCRIPTION OF THE DRAWINGS

The above and other objects, features and advantages of the present invention will become more apparent from the following detailed description made with reference to the accompanying drawings. In the drawings:

FIG. 2 is a flow chart showing a sealing valve control processing according to the embodiment of the present disclosure.

DETAILED DESCRIPTION

Figure 1:
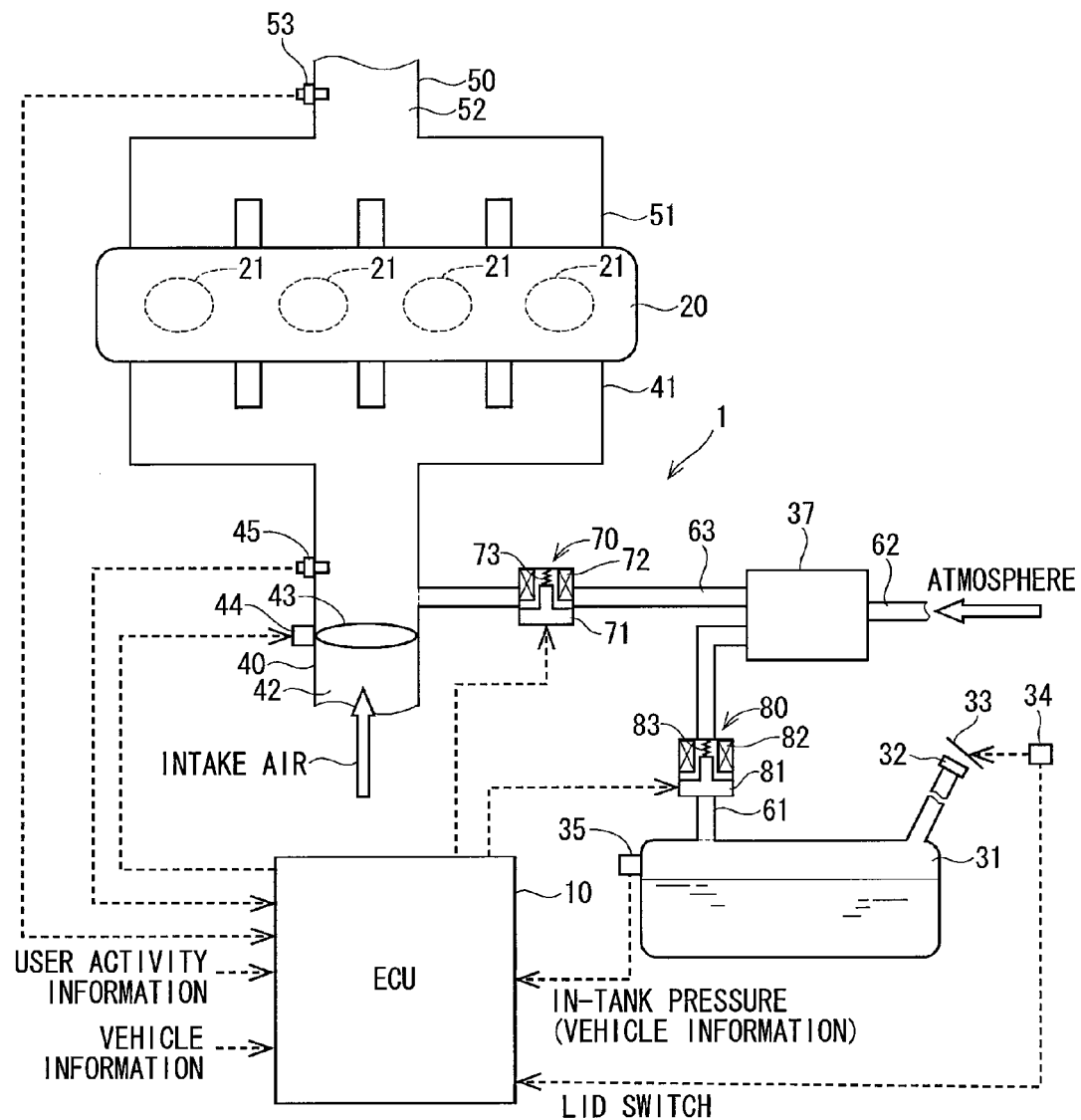
FIG. 1 is a block diagram showing a configuration of a vapor fuel processing apparatus according to an embodiment of the present disclosure.

As follows, an example of a vapor fuel processing apparatus according to the present disclosure will be described with reference to drawings.

Embodiment

FIG. 1 shows a vapor fuel processing apparatus according to an embodiment of the present disclosure. The vapor fuel processing apparatus 1 of the present embodiment is employed in a vehicle (not shown) equipped with an internal combustion engine 20. The vapor fuel processing apparatus 1 of the present embodiment includes an electronic control unit (ECU: control section) 10, a sealing valve 80, and/or the like.

The vapor fuel processing apparatus 1 is configured to supply evaporated fuel, which is produced in a fuel tank 31, into the engine 20 thereby to process the evaporated fuel. In the following description, the operation to supply evaporated fuel into the engine 20 is termed "purge."

The fuel tank 31 has a fill opening 32. The fuel tank 31 stores liquid fuel, such as gasoline, refueled through the fill opening 32. The vehicle has a lid 33, which is located in the vicinity of the fill opening 32 and operated when the fuel tank 31 is supplied with fuel from the outside. The lid 33 is opened and closed when a lid switch 34 is operated by a user. The lid switch 34 is located at a position, which is, for example, close to a driver's seat. When the lid switch 34 is activated, the lid 33 is opened. When the lid switch 34 is de-activated, the lid 33 is closed.

Fuel in the fuel tank 31 partially evaporates as evaporated fuel from the surface of the liquid fuel. The evaporated fuel occupies an upper space in the fuel tank 31. The evaporated fuel in the fuel tank 31 varies in quantity according to a purge condition of the evaporated fuel into the engine 20, atmospheric temperature, internal pressure of the fuel tank 31, and/or the like. In consideration of this, according to the present embodiment, an internal pressure sensor 35 is equipped to detect the internal pressure of the fuel tank 31.

The engine 20 is driven by consuming fuel, such as gasoline. The engine 20 according to the present embodiment includes four cylinders 21. That is, the engine 20 is a 4-cylinder engine. The engine 20 is equipped with an intake pipe 40 and an exhaust pipe 50. The intake pipe 40 has four branched portions, which are located on the side of the engine 20 and connected to the cylinders 21, respectively. The four branched portions of the intake pipe 40 configure an intake manifold 41. The exhaust pipe 50 has four branched portions, which are located on the side of the engine 20 and connected to the cylinders 21, respectively. The four branched portions of the exhaust pipe 50 configure an exhaust manifold 51. The intake pipe 40 has an inlet port (not shown) on the opposite side from the engine 20. The exhaust pipe 50 has an outlet port (not shown) on the opposite side from the engine 20. Both the inlet port and the outlet port are opened to the atmosphere.

When the engine 20 is in operation, air is drawn into the cylinders 21 through an intake air passage 42, which is defined in the intake pipe 40. Hereafter, air, which is drawn into the cylinders 21, is termed "intake air." A throttle valve 43 is equipped between the inlet port of the intake air passage 42 and the intake manifold 41. The throttle valve 43 opens and closes the intake air passage 42, thereby to control a quantity of an intake air. An actuator 44 manipulates the throttle valve 43 to control opening and closing of the throttle valve 43. An ECU 10 controls manipulation of the actuator 44 according to information about an accelerator position. An intake air pressure sensor 45 is equipped in the intake pipe 40 to detect an internal pressure of the intake pipe 40.

Fuel is supplied from the fuel tank 31 and is injected from injectors (not shown). The injected fuel is mixed with intake air to be a mixture, and the mixture is burned within the cylinders 21. Fuel is burned in the cylinders 21 to produce combustion gas. The produced combustion gas is exhausted from the cylinders 21 to the atmosphere through an exhaust passage 52, which is defined in the exhaust pipe 50. Vapor exhausted from the cylinders 21 contains combustion gas. Hereafter, the vapor exhausted from the cylinders 21 is termed "exhaust gas." An air/fuel (A/F) sensor 53 is equipped in the exhaust pipe 50 to detect a quantity of oxygen contained in exhaust gas.

The fuel tank 31 is connected with an end of a vapor passage 61. The vapor passage 61 has the other end connected to a canister 37. In the present configuration, the vapor passage 61 communicates the fuel tank 31 with the canister 37. The sealing valve 80 is equipped to the vapor passage 61. Evaporated fuel is produced in the fuel tank 31 and supplied through the vapor passage 61 into the canister 37. The canister 37 absorbs and stores the evaporated fuel therein. The canister 37 is connected with an end of an atmospheric air passage 62. The atmospheric air passage 62 has the other end opened to the atmosphere. The canister 37 is connected with an end of a purge passage 63. The purge passage 63 has the other end connected to a portion of the intake air passage 42 on the side of the intake manifold 41 relative to the throttle valve 43. A purge valve 70 is equipped to the purge passage 63.

In the above-described configuration, negative pressure may occur in the intake air passage 42 on the side of the engine 20 relative to the throttle valve 43. That is, negative pressure may occur in the intake air passage 42 on the downstream side of the throttle valve 43 relative to the airflow. In such a state, evaporated fuel, which is absorbed in the canister 37, flows together with air, which flows from the atmospheric air passage 62, through the purge passage 63. Thus, the evaporated fuel flowing with air is induced into a portion of the intake air passage 42 on the downstream side of the throttle valve 43. The evaporated fuel, which flows into the portion of the intake air passage 42 on the downstream side of the throttle valve 43, flows together with intake air through the intake manifold 41 to be supplied into the cylinders 21 of the engine 20. Thus, the evaporated fuel is burned together with fuel, which is injected from the injectors, within the cylinders 21. Thus, evaporated fuel produced in the fuel tank 31 is processed in this way.

The purge valve 70 is equipped to the purge passage 63. The purge passage 63 communicates the canister 37 with the portion of the intake air passage 42 on the downstream side of the throttle valve 43. The purge valve 70 is an electromagnetically operated valve driven by a solenoid device. The ECU 10 controls manipulation of the purge valve 70. The purge valve 70 includes a first valve member 71, a first electromagnetic actuator 72, and a first biasing member 73. The first valve element 71 moves back and forth thereby to open and close the purge passage 63. The first electromagnetic actuator 72 is supplied with an electric current on receiving a driving instruction signal from the ECU 10, thereby to form a magnetic circuit. Thus, the first electromagnetic actuator 72 drives the first valve element 71 in a valve-open direction. The first biasing member 73 biases the first valve element 71 in a valve-close direction. In the present configuration, the purge valve 70 closes due to application of the biasing force from the first biasing member 73, when the first electromagnetic actuator 72 is not supplied with an electric current. That is, the purge valve 70 is a normally close type valve device. During the purge valve 70 closes, flow of fluid through the purge passage 63 is prohibited. Contrary, during the purge valve 70 opens, flow of fluid through the purge passage 63 is permitted.

The sealing valve 80 is equipped to the vapor passage 61, which communicates the fuel tank 31 with the canister 37. The sealing valve 80 is equipped to the vapor passage 61 to prohibit emission of evaporated fuel from the fuel tank 31 through the canister 37 and the atmospheric air passage 62. That is, in the present embodiment, the fuel tank 31 equipped with the sealing valve 80 forms a sealed tank system.

The sealing valve 80 is an electromagnetically operated valve driven by a solenoid device. The ECU 10 controls manipulation of the sealing valve 80. The sealing valve 80 includes a second valve element 81, a second electromagnetic actuator 82, and a second biasing member 83. The second valve element 81 moves back and forth thereby to open and close the vapor passage 61. The second electromagnetic actuator 82 is supplied with an electric current on receiving a driving instruction signal from the ECU 10, thereby to form a magnetic circuit. Thus, the second electromagnetic actuator 82 drives the second valve element 81 in a valve-open direction. The second biasing member 83 biases the second valve element 81 in a valve-close direction. In the present configuration, the sealing valve 80 closes due to application of the biasing force from the second biasing member 83, when the second electromagnetic actuator 82 is not supplied with an electric current. That is, the sealing valve 80 is a normally close type valve device. During the sealing valve 80 closes, flow of fluid through the vapor passage 61 is prohibited. Contrary, during the sealing valve 80 opens, flow of fluid through the vapor passage 61 is permitted. In addition, a mechanical valve device (not shown) is equipped in parallel with the sealing valve 80. The mechanical valve device opens when an internal pressure of the fuel tank 31 becomes greater than or equal to a predetermined value.

The ECU 10 is a small-sized computer including a CPU as a computation unit, a ROM and a RAM as a storage unit, an input-and-output unit, and/or the like. The ECU 10 executes a program stored in the ROM to implement a processing according to information, such as a signal acquired from various sensors equipped at various positions in the vehicle. Thus, the ECU 10 controls operation of various devices of the vehicle, such as the injectors, the throttle valve 43, the purge valve 70, the sealing valve 80, and/or the like, thereby to control the vehicle comprehensively. More specifically, the ECU 10 includes a drive circuit, which is for driving the purge valve 70, a drive circuit, which is for driving the sealing valve 80, and/or the like.

In the present embodiment, the ECU 10 acquires user activity information. The user activity information may include, for example, information, which is about an operation state of an ignition key (ignition device), information, which is about operation of an entrance door, information, which is about operation of a shift lever, and/or information, which is about operation of a parking brake.

The ECU 10 acquires remaining fuel quantity information, which is about a remaining fuel quantity in the fuel tank 31. The ECU 10 acquires an internal pressure detection value about an internal pressure of the fuel tank 31 detected by the internal pressure sensor 35. This internal pressure detection value may correspond to "internal pressure information about internal pressure of the fuel tank." Furthermore, the ECU 10 calculates a lapsed time period after opening the sealing valve 80 at the previous time. "Vehicle information" may include remaining fuel quantity information, which is about remaining fuel quantity in the fuel tank 31, the internal pressure detection value, which is detected by the internal pressure sensor 35, and lapsed time period information, which is about the lapsed time period from the valve opening at the previous time.

The ECU 10 further calculates a purge concentration estimate value C according to a detection signal, which is sent from the A/F sensor 53. The purge concentration estimate value C represents a concentration of evaporated fuel contained in purge gas supplied into the intake air passage 42. The ECU 10 further detects an opening/closing state of the lid 33 according to an ON/OFF state of the lid switch 34. In other words, the lid switch 34 according to the present embodiment also functions as a sensor to detect the opening/closing state of the lid 33.

Herein, a condition is assumed that the fuel tank 31 is refueled, and the internal pressure of the fuel tank 31 is higher than the atmospheric pressure. In such a condition, when the fill opening 32 is opened, evaporated fuel in the fuel tank 31 may be emitted to the atmosphere through the fill opening 32. In consideration of that, in the present embodiment, when the lid 33 is opened and when the lid switch 34 is activated, the sealing valve 80 is opened. In this way, evaporated fuel in the fuel tank 31 is supplied into the canister 37, thereby to reduce internal pressure of the fuel tank 31. Thus, emission of evaporated fuel through the fill opening 32 is restricted.

It is further noted that, it may take a long time to reduce internal pressure of the fuel tank 31 when, for example, internal pressure of the fuel tank 31 is high. It may be assumable that a long time (release time period T) may be needed to reduce internal pressure of the fuel tank 31 to a predetermined pressure, which is close to the atmospheric pressure. In such a case, the fill opening 32 may be opened by a user, before internal pressure of the fuel tank 31 sufficiently decreases. Consequently, evaporated fuel in the fuel tank 31 may be emitted from the fill opening 32 to the atmosphere. It is further noted that, in a case where opening of the fill opening 32 is prohibited until internal pressure of the fuel tank 31 sufficiently decreases, a user may be kept waiting for refueling. Consequently, the system may be inconvenient for a user who hurries refueling.

In consideration of that, according to the present embodiment, in a case where a user may possibly refuel, that is, the user is presumed to have an intention to refuel, and when the release time period T is presumed to be long, the sealing valve 80 is opened before the user starts an actual activity to refuel. In this way, internal pressure of the fuel tank 31 is reduced, thereby to restrict emission of evaporated fuel from the fill opening 32 to the atmosphere, without keeping a user waiting for refueling.

As follows, a control processing of the sealing valve 80 will be described with reference to FIG. 2. The present processing is executed by the ECU 10 at a predetermined interval. At first step S101, it is determined whether the lid switch 34 is activated (turned ON). That is, it is determined whether the lid 33 is opened. When the lid switch 34 is activated, that is, when the lid 33 is opened (S101: YES), the processing proceeds to S110. When the lid switch 34 is de-activated (turned OFF), that is, when the lid 33 is closed (S101: NO), the processing proceeds to S102.

At S102, the release time period T is estimated. The release time period T is a time period needed to reduce internal pressure of the fuel tank 31 to the predetermined pressure, which is close to the atmospheric pressure. In the present embodiment, the release time period T is presumed according to the vehicle information, such as the remaining fuel quantity in the fuel tank 31, internal pressure of the fuel tank 31, and the lapsed time period after the sealing valve 80 is opened at the previous time. When the remaining fuel quantity in the fuel tank 31 is small, the release time period T becomes long. When the internal pressure of the fuel tank 31 is high, the release time period T becomes long. When the lapsed time period is long after the sealing valve 80 is opened at the previous time, the release time period T becomes long. In consideration of those premises, according to the present embodiment, the ECU 10 beforehand stores a data map. In the data map, the release time period T is associated with the remaining fuel quantity in the fuel tank 31, internal pressure of the fuel tank 31, and the lapsed time period after the sealing valve 80 is opened at the previous time. At S102, the release time period T is presumed with reference to the data map. It is noted that, the release time period T may be presumed by executing an arithmetic processing and/or the like, instead of with reference to the data map.

At S103, it is determined whether the release time period T is greater than a predetermined time period Ts. The predetermined time period Ts is arbitrarily set according to, for example, a time period, which is needed to open (release) the fill opening 32 after the lid switch 34 is operated, and/or the like. When the release time period T is determined to be less than or equal to the predetermined time period Ts (S103: NO), the processing subsequent to S104 is not executed. Alternatively, when the release time period T is determined to be greater than the predetermined time period Ts (S103: YES), the processing proceeds to S104.

At S104, the user activity information is acquired. In the present embodiment, as the user activity information, for example, information about the operation state of the ignition key (ignition device), information about operation of an entrance door, information about operation of the shift lever, and/or information about operation of the parking brake, are acquired. At S105, it is determined whether the ignition key (ignition device) is de-activated, i.e., turned OFF. When it is determined that the ignition key is not de-activated (S105: NO), that is, when the ignition key (ignition device) is still activated, the processing subsequent to S106 is not executed. When it is determined that the ignition key (ignition device) is de-activated (S105: YES), the processing proceeds to S106.

At S106, it is determined whether the entrance door is opened, whether the parking brake is activated, and whether the position of the shift lever is in a parking (P) position. When the entrance door is not opened, when the parking brake is de-activated (OFF), and when the position of the shift lever is in a position other than the parking (P) position, (S106: NO), the processing subsequent to S107 is not executed. Alternatively, when the entrance door is opened, when the parking brake is activated (ON), and/or when the position of the shift lever is in the parking (P) position, (S106: YES), the processing proceeds to S107. In the present embodiment, when an affirmative determination is made at both S105 and S106, it is determined that the user has an intension (refueling intention) to refuel.

At S107, it is determined whether the purge of evaporated fuel is implemented from the canister 37 into the intake air passage 42, during traveling immediately before. The present determination is made according to drive information about the purge valve 70. The traveling immediately before may be in a predetermined time period until de-activation of the ignition key. Alternatively, the traveling immediately before may be in a time period after activation of the ignition key until de-activation of the ignition key at the previous time. When it is determined that purge of evaporated fuel was not implemented during the traveling immediately before, that is, when the purge valve 70 was not opened during the traveling immediately before (S107: NO), it is presumed that the canister 37 is approximately in a "breakthrough state." In such a breakthrough state, the canister 37 is incapable of absorbing evaporated fuel. Thus, in such a state, processing subsequent to S108 is not executed. In other words, when purge of evaporated fuel was not implemented during the traveling immediately before (S107: NO), the sealing valve 80 is not opened. When it is determined that purge of evaporated fuel from the canister 37 into the intake air passage 42 was implemented during the traveling immediately before, that is, when the purge valve 70 was opened during the traveling immediately before (S107: YES), the processing proceeds to S108.

At S108, a purge concentration estimate value C is calculated according to a detection value of the A/F sensor 53. The purge concentration estimate value C represents a concentration of evaporated fuel contained in purge gas supplied from the canister 37 into the intake air passage 42 during the traveling immediately before. At S109, it is determined whether the purge concentration estimate value C is less than a predetermined concentration Cs. When the purge concentration estimate value C is determined to be greater than or equal to the predetermined concentration Cs (S109: NO), it is presumed that the canister 37 is approximately in the breakthrough state. In this case, the processing does not proceed to S110. In other words, when the purge concentration estimate value C is greater than or equal to the predetermined concentration Cs (S109: NO), the sealing valve 80 is not opened. When the purge concentration estimate value C is determined to be less than the predetermined concentration Cs (S109: YES), it is presumed that the canister 37 is capable of absorbing evaporated fuel. In this, case, the processing proceeds to S110.

In the present embodiment, when affirmative determination is made at both S107 and S109, it is presumed in a state where the canister 37 is capable of absorbing evaporated fuel. Alternatively, when a negative determination is made at S107 or S109, it is presumed that the canister 37 is approximately in a breakthrough state and is incapable of absorbing evaporated fuel.

At S110, a driving instruction is sent to drive the sealing valve 80. The sealing valve 80 is opened, when an electric current is supplied to the second electromagnetic actuator 82 thereby to operate the second valve element 81. Thus, flow of fluid from the fuel tank 31 into the canister 37 is permitted. Thus, evaporated fuel in the fuel tank 31 flows through the vapor passage 61, and the evaporated fuel is adsorbed in the canister 37. Thus, internal pressure of the fuel tank 31 decreases, in this way. When internal pressure of the fuel tank 31 decreases to the predetermined pressure, which is close to the atmospheric pressure, electricity supply to the second electromagnetic actuator 82 is terminated thereby to close the sealing valve 80.

Summarizing the present embodiment, the sealing valve 80 is opened (S110) before the lid 33 is opened (S101: NO), when the conditions are satisfied. The present conditions are satisfied when the user is presumed to have an intention to refuel (S105: YES, S106: YES), when it takes time to reduce internal pressure of the fuel tank 31 approximately to the atmospheric pressure by opening (releasing) (S103: YES), and when it is presumed that the canister 37 is capable of adsorbing evaporated fuel (S107: YES, S109: YES). The present configuration enables to restrict emission of evaporated fuel through the fill opening 32 at the time of refueling, without keeping a user waiting at the time of refueling.

As described above in detail, (1) the vapor fuel processing apparatus 1 according to the present embodiment is configured to cause the canister 37 to absorb evaporated fuel, which is produced in the fuel tank 31, and to cause the evaporated fuel, which is absorbed in the canister 37, to be supplied to the engine 20. The vapor fuel processing apparatus 1 includes the sealing valve 80 and the ECU 10.

The sealing valve 80 is equipped to the vapor passage 61, which communicates the fuel tank 31 with the canister 37.

The ECU 10 is configured to control operation (manipulation) to drive the sealing valve 80. The ECU 10 is configured to detect the opening/closing state of the lid 33 equipped to the fill opening 32 of the fuel tank 31. The ECU 10 is further configured to presume existence of a refueling intention according to the user activity information, which is related to an activity of a user (S105, S106). The ECU 10 is further configured to presume the release time period T, which is the time period needed to release pressure in the fuel tank 31, according to the vehicle information related to the state of the vehicle (S102).

In the present embodiment, when the lid 33 is opened (S101: YES), the sealing valve 80 is opened (S110). In addition, even when the lid 33 is closed (S101: NO), the sealing valve 80 is opened (S110) when it is presumed that a refueling intention exists (S105: YES, S106: YES) and when the presumed release time period T is determined to be greater than the predetermined time period Ts (S103: YES).

In the present embodiment, when the lid 33 of the fill opening 32 is opened, the sealing valve 80 is opened. In this way, evaporated fuel in the fuel tank 31 is supplied toward the canister 37, thereby to restrict evaporated fuel from being emitted through the fill opening 32 to the atmosphere. In addition, even when the lid 33 is closed, existence of the refueling intention is presumed according to the user activity information. When it is presumed that the refueling intention exists and when it takes time to release pressure in the fuel tank 31, the sealing valve 80 is opened before the lid 33 is opened. In this way, pressure in the fuel tank 31 is released. The present configuration enables to restrict emission of evaporated fuel through the fill opening 32 at the time of refueling and to reduce inconvenience caused by keeping a user waiting. Thus, the present configuration enables smooth refueling thereby to enhance convenience. In addition, the present configuration presumes the release time period T and opens the sealing valve 80 in advance only, when pressure release is needed in advance. Thus, the present configuration does not implement unnecessary manipulation of the sealing valve 80, thereby to restrict energy consumption caused by manipulation of the sealing valve 80.

(2) The vehicle information used for estimation of the release time period T includes the remaining fuel quantity information, the internal pressure information, and the lapsed time period information. The remaining fuel quantity information is related to the remaining fuel quantity in the fuel tank 31. The internal pressure information is related to internal pressure of the fuel tank 31. The lapsed time period information is related to the lapsed time period after the sealing valve 80 is opened. Primary parameters related to the time period needed to release pressure in the fuel tank 31 are the internal volume of the fuel tank 31 and the internal pressure of the fuel tank 31. Therefore, with reference to the above-described vehicle information, the release time period T can be presumed appropriately, and manipulation of the sealing valve 80 can be appropriately controlled.

(3) The user activity information is referred for estimation of existence of the refueling intention. The user activity information includes at least one of the information, which is about the operation state of the ignition key of the vehicle, the information, which is about the operation state of the entrance door of the vehicle, the information, which is about the operation state of the shift lever of the vehicle, and the information, which is about the operation state of the parking brake of the vehicle. In the present embodiment, existence of the refueling intention is presumed with reference to existing information conventionally acquirable from the ECU 10. Therefore, the refueling intention can be presumed without equipment of an additional device, such as an additional sensor. Thus, the present configuration enables to control manipulation of the sealing valve 80 appropriately.

(4) The ECU 10 presumes whether the canister 37 is capable of absorbing evaporated fuel (S107-S109). When it is presumed that the canister 37 is incapable of absorbing evaporated fuel (S107: NO, S109: NO), the sealing valve 80 is prohibited from opening in the time period, in which the lid 33 is closed (S101: NO).

In a condition where the canister 37 is approximately in the breakthrough state, when the sealing valve 80 is opened, evaporated fuel, which it is not absorbed in the canister 37, may be emitted through the atmospheric air passage 62 to the atmosphere. In consideration of this, in the present embodiment, when it is presumed that the canister 37 cannot absorb evaporated fuel in a condition where the canister 37 is approximately in the breakthrough state, the manipulation to open the sealing valve 80 before the lid 33 is opened is prohibited. In other words, the in-advance pressure release of the fuel tank 31 is prohibited. The present configuration enables to restrict emission of evaporated fuel to the atmosphere due to implementation of the in-advance pressure release.

(5) In the present embodiment, when the purge concentration estimate value C is greater than or equal to the predetermined concentration Cs (S109: NO), it is presumed that the canister 37 is incapable of absorbing evaporated fuel. The purge concentration estimate value C represents the concentration of evaporated fuel contained in purge gas supplied from the canister 37 toward the engine 20 in the traveling immediately before. The present configuration enables to presume the state of the canister 37 appropriately.

(6) In addition, when evaporated fuel was not supplied from the canister 37 toward the engine 20 in the traveling immediately before (S107: NO), the present configuration presumes that the canister 37 is incapable of absorbing evaporated fuel. The present configuration enables to presume the state of the canister 37 appropriately.

In the present embodiment, the ECU 10 may function as a manipulation control unit, a lid opening-and-closing detection unit, a refueling intention estimation unit, a release time period estimation unit, and a canister state estimation unit. In FIG. 2, S110 may be one example of a function of the manipulation control unit. S101 may be one example of a function of the lid opening-and-closing detection unit. S105 and S106 may be one example of a function of the refueling intention estimation unit. S102 may be one example of a function of the release time period estimation unit. S107 and S109 may be one example of a function of the canister state estimation unit.

Other Embodiment (a) In the above-described embodiment, the vehicle information includes the remaining fuel quantity information, the internal pressure information, and the lapsed time period information after the sealing valve is opened. In the present other embodiment, the vehicle information may include at least one of the remaining fuel quantity information, the internal pressure information, and the lapsed time period information after the sealing valve is opened. The vehicle information may include other information to estimate the release time period.

(b) In the present other embodiment, one of S105 and S106 in FIG. 2 may be omitted from the processing to estimate the refueling intention. At S106, the estimation may be made according to at least one of the operation state of the entrance door, the operation state of the parking brake, and the operation state of the shift lever. It may be determined that the refueling intention exists when, for example, the entrance door is opened, the parking brake is activated, and the position of the shift lever is at the parking (P) position. That is, the user activity information may include at least one of the information, which is about the operation state of the ignition key of the vehicle, the information, which is about the operation state of the entrance door of the vehicle, the information, which is about the operation state of the shift lever of the vehicle, and the information, which is about the operation state of the parking brake of the vehicle. For example, the user activity information may include other information, such as a detection signal of a seating sensor, to presume the existence of the refueling intention.

(c) In the above-described embodiment, in a condition where it is presumed that the canister is incapable of absorbing evaporated fuel, opening of the sealing valve is prohibited during the lid is closed. In the present other embodiment, when it is determined that the refueling intention exists and when the release time period is determined to be greater than the predetermined time period, the sealing valve may be opened, regardless of the state of the canister. It may be determined whether the canister is capable of absorbing evaporated fuel, according to one of the concentration of evaporated fuel contained in purge gas supplied from the canister to the internal combustion engine and existence of supply of evaporated fuel from the canister to the internal combustion engine side in the traveling immediately before. That is, either S107 or the combination of S108 and S109 in FIG. 2 may be omitted. Estimation of the state of the canister may be made according to other information.

(d) In the above-described embodiment, opening or closing of the lid is determined according to the determination whether the lid switch is activated (ON) or de-activated (OFF). In the present other embodiment, an additional sensor for detecting opening or closing of the lid may be equipped close to the lid in a vehicle, which includes a lid opened and closed manually.

(e) In the above-described embodiment, the mechanical valve device is equipped in parallel with the sealing valve to be opened when internal pressure of the fuel tank becomes higher than the predetermined value. In the present other embodiment, the mechanical valve device may be integrated with the sealing valve into one component.

(f) In the above-described embodiment, the exemplified engine is a 4-cylinder engine. It is noted that, the above-described configuration may be applied to various kind of engines, regardless of the number of cylinders. The vapor fuel processing apparatus may be applied to various vehicles such as an idling stop vehicle.

The above-described control section includes the manipulation control unit, the lid opening-and-closing detection unit, the refueling intention estimation unit, and the release time period estimation unit. The manipulation control unit is configured to control manipulation (driving) of the sealing valve. The lid opening-and-closing detection unit is configured to detect the opening/closing state of the lid of the fill opening of the fuel tank. The refueling intention estimation unit is configured to presume existence of the refueling intention according to the user activity information related to the activity of the user. The release time period estimation unit is configured to presume, according to the vehicle information related to the state of the vehicle, the release time period, which is needed to release pressure in the fuel tank.

According to the present disclosure, the manipulation control unit opens the sealing valve when the lid is opened. In addition, the manipulation control unit opens the sealing valve, even when the lid is closed, in a case where the refueling intention estimation unit estimates that the refueling intention exists, and the release time period estimation unit estimates the release time period to be greater than the predetermined time period.

According to the present disclosure, the sealing valve is opened, when the lid of the fill opening is opened, thereby to supply evaporated fuel in the fuel tank toward the canister. Thus, emission of evaporated fuel through the fill opening to the atmosphere can be restricted.

In addition, existence of the refueling intention is estimated according to the user activity information, such as the operation state of the ignition key, the operation state of the entrance door of the vehicle, the operation state of the shift lever of the vehicle, the operation state of the parking brake of the vehicle, and/or the like. In a case where it is presumed that the refueling intention exists, and when pressure release of the fuel tank takes time, the sealing valve is opened before the lid is opened, thereby to release pressure in the fuel tank, even when the lid is closed. The present configuration restricts emission of evaporated fuel through the fill opening at the time of refueling. In addition, the present configuration reduces inconvenience caused by keeping a user waiting. Therefore, convenience for a user can be enhanced. In addition, the present configuration estimates the release time period and opens the sealing valve only when the in-advance pressure release is needed. Therefore, the present configuration restricts unnecessarily manipulation of the sealing valve thereby to restrict energy consumption caused by manipulation (driving) of the sealing valve.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vapor fuel processing apparatus configured to cause a canister to absorb evaporated fuel produced in a fuel tank and to supply evaporated fuel absorbed in the canister to an internal combustion engine, the vapor fuel processing apparatus comprising:
   a sealing valve equipped to a vapor passage, which communicates the fuel tank with the canister; and
   a control section including:
      a manipulation control unit configured to control manipulation of the sealing valve;
      a lid opening-and-closing detection unit configured to detect an opening/closing state of a lid of a fill opening of the fuel tank;
      a refueling intention estimation unit configured to estimate existence of a refueling intention with reference to user activity information related to an activity of a user; and
      a release time period estimation unit configured to estimate a release time period, which is needed to release a pressure in the fuel tank, with reference to vehicle information relating to a state of a vehicle, wherein
   the manipulation control unit is further configured to open the sealing valve when the lid is opened, and
   the manipulation control unit is further configured to open the sealing valve, even in a case where the lid is closed, when the refueling intention estimation unit estimates that the refueling intention exists, and when the release time period, which is estimated by the release time period estimation unit, is determined to be greater than a predetermined time period.

2. The vapor fuel processing apparatus according to claim 1, wherein
the vehicle information, which is referred for estimation of the release time period, includes at least one of:
remaining fuel quantity information about a remaining fuel quantity in the fuel tank;
internal pressure information about an internal pressure of the fuel tank; and
lapsed time period information about a lapsed time after the sealing valve is opened.

3. The vapor fuel processing apparatus according to claim 1, wherein the user activity information, which is referred for estimation of the existence of the refueling intention, includes at least one of:
information about an operation state of an ignition key of the vehicle;
information about an operation state of an entrance door of the vehicle;
information about an operation state of a shift lever of the vehicle; and
information about an operation state of a parking brake of the vehicle.

4. The vapor fuel processing apparatus according to claim 1, wherein
the control section further includes a canister state estimation unit configured to estimate whether the canister is capable of absorbing evaporated fuel, and
the manipulation control unit is further configured to prohibit the sealing valve from opening during the lid is closed, when the canister state estimation unit estimates that the canister is incapable of absorbing evaporated fuel.

5. The vapor fuel processing apparatus according to claim 4, wherein
the canister state estimation unit is further configured to estimate that the canister is incapable of absorbing evaporated fuel, when an evaporated fuel concentration in purge gas, which is supplied from the canister toward the internal combustion engine in a traveling immediately before, is greater than a predetermined concentration.

6. The vapor fuel processing apparatus according to claim 4, wherein the canister state estimation unit is further configured to estimate that the canister is incapable of absorbing evaporated fuel, when evaporated fuel is not supplied from the canister to the internal combustion engine in a traveling immediately before.

* * * * *